Nov. 3, 1953     B. E. PIERCE     2,657,831
FERTILIZER DISTRIBUTOR
Filed Jan. 10, 1951     2 Sheets-Sheet 1
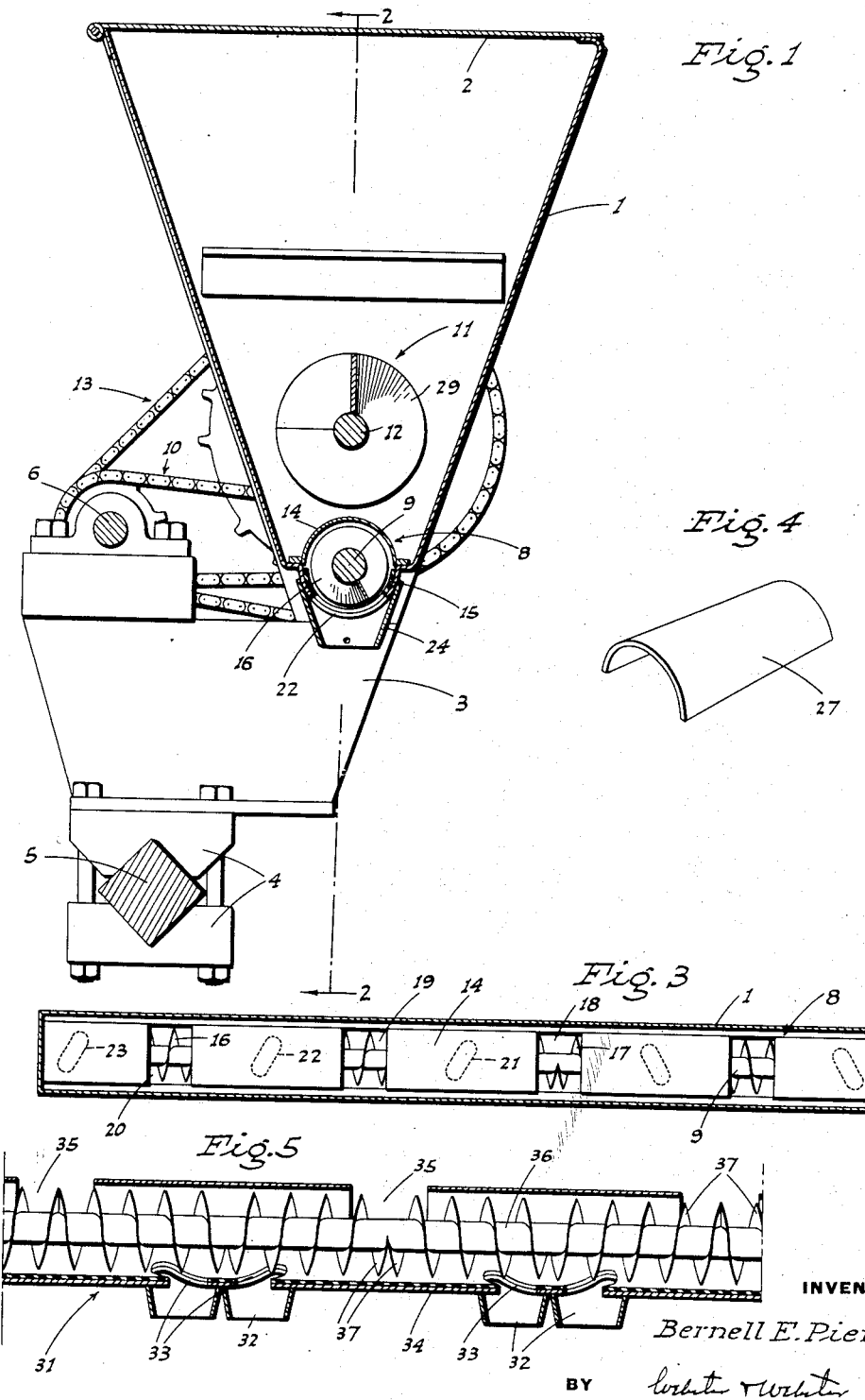
INVENTOR
Bernell E. Pierce
BY
ATTORNEYS

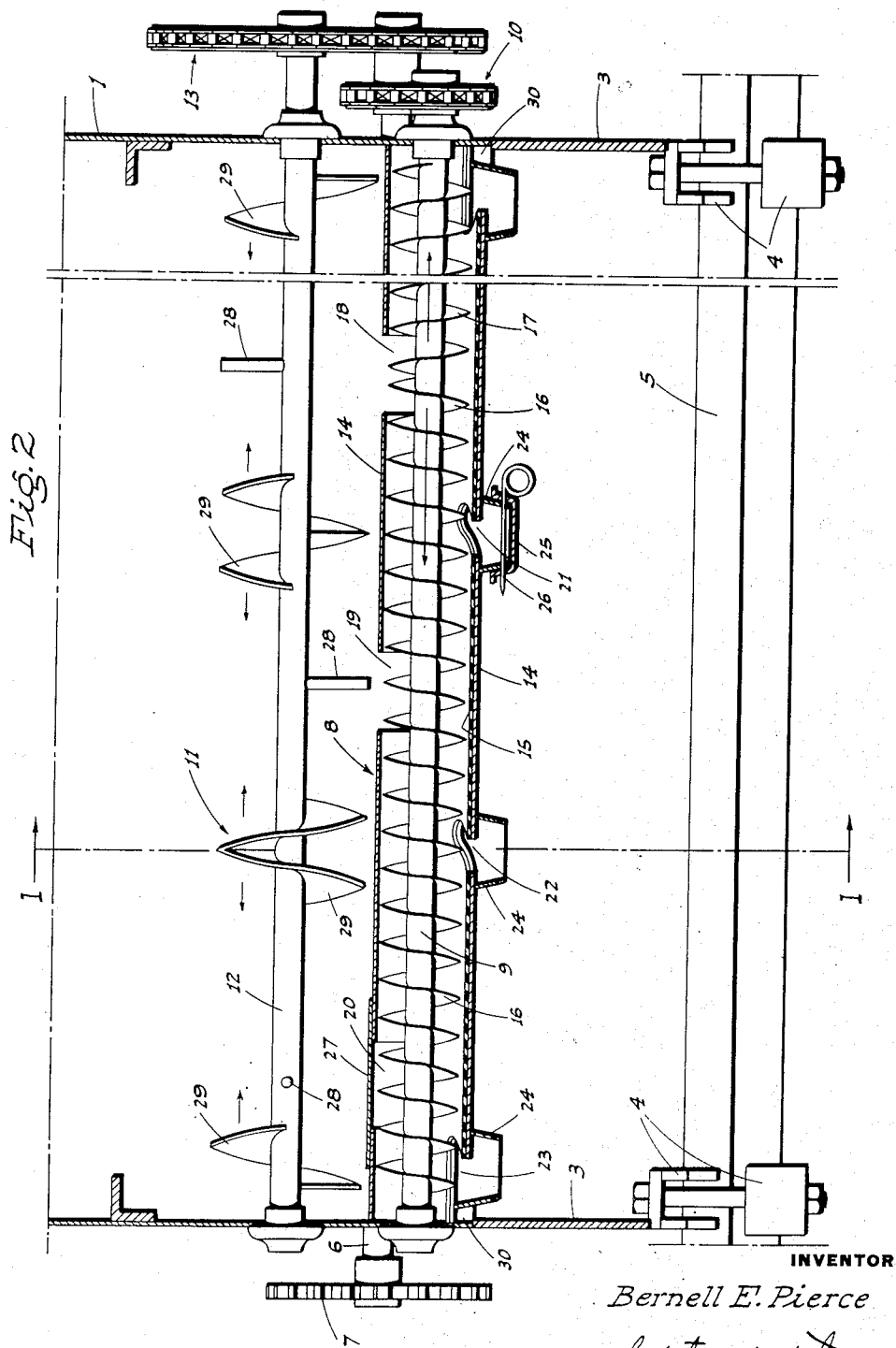

Patented Nov. 3, 1953

2,657,831

UNITED STATES PATENT OFFICE 2,657,831

FERTILIZER DISTRIBUTOR

Bernell E. Pierce, Pleasanton, Calif.

Application January 10, 1951, Serial No. 205,340

2 Claims. (Cl. 222—272)

1

This invention relates generally to an agricultural implement, and in particular to a power-driven fertilizer distributor.

A major object of the invention is to provide a fertilizer distributor which embodies, with a hopper, a novel mechanism operative to deliver controlled quantities of fertilizer from said hopper and through selectively regulated outlets; the distributor being especially designed, but not limited, for the distribution of commercial type fertilizers.

Another important object of the invention is to provide the fertilizer distributor with an auger feed unit of novel construction and function.

A further object of the invention is to provide a novel rotary agitator working in the hopper in cooperative relation to the auger feed unit, as above.

A still further object of the invention is to provide a fertilizer distributor which force-feeds the fertilizer to the outlets in proportioned quantity; the implement thus being non-clogging, and effective to feed and distribute fertilizer which may be moist or lumpy.

It is also an object of the invention to provide a fertilizer distributor which is designed for ease and economy of manufacture.

An additional object of the invention is to provide a fertilizer distributor which is heavy-duty, rugged, and dependable; the auger feed unit being adapted for ready adjustment to broadcast fertilizer, to side dress along crop rows, or to drill the fertilizer.

Still another object of the invention is to provide a practical and reliable fertilizer distributor, and one which will be exceedingly effective for the purpose for which it is designed.

These objects are accomplished by means of such structure and relative arrangement of parts as will fully appear by a perusal of the following specification and claims.

In the drawings:

Fig. 1 illustrates the fertilizer distributor in transverse section; the view being taken on line 1—1 of Fig. 2.

Fig. 2 is a sectional elevation, foreshortened, on line 2—2 of Fig. 1.

Fig. 3 is a top plan view of the auger feed unit.

Fig. 4 is a perspective view of one of the caps for the auger feed unit.

Fig. 5 is a fragmentary sectional elevation of a modified auger feed unit.

Referring now more particularly to the characters of reference on the drawings, and at present to Figs. 1-4 inclusive, the novel fertilizer

2 distributor comprises an elongated hopper 1 fitted, on top, with a hinged cover 2; such hopper being supported at the ends by fixed depending end plates 3 having clamps 4 at their lower ends.

The clamps 4 are adapted to be secured to a horizontal, transverse tool bar 5 of a tractor or wheel-supported implement.

A countershaft 6 is journaled in connection with, and extends between, the end plates 3 at their upper end and alongside the hopper 1; such countershaft being driven, from one wheel of the tractor or implement, by connections which include a sprocket 7, but which connections are not otherwise shown.

The bottom of the hopper 1 is comprised of a horizontal, longitudinal, auger feed unit, indicated generally at 8, which unit includes a center shaft 9 driven, at one end and exteriorly of the hopper 1, from the countershaft 6 by an endless chain and sprocket unit 10. Above the auger feed unit 8, and within the hopper 1, there is a horizontal, longitudinal, rotary agitator unit, indicated generally at 11, which includes a center shaft 12; the center shaft 12 being driven, at one end and exteriorly of the hopper 1, by means of an endless chain and sprocket unit 13.

The auger feed unit 8 comprises a cylindrical feed tube 14, preferably constructed of initially separate upper and lower halves; the lower half having an inner facing or lining of rubber 15; the purpose of this rubber lining being to assure of free flow of the fertilizer along the feed tube 14, as fertilizer does not tend to stick or build up on rubber as it does on metal.

The center shaft 9 is fitted with helical or auger flights 16 and 17 which extend from a center point on said shaft, feeding in opposite directions therefrom; i. e. from the center point toward the outer end of the shaft.

The upper half of the feed tube 14 is formed with a central intake opening 18, and in each lengthwise half thereof, with an intermediate intake opening 19 and an end intake opening 20; the openings 18, 19, and 20 being of substantially 180° in transverse extent.

The bottom of the feed tube 14 is formed, in each longitudinal half thereof, with a plurality of diagonal outlet openings 21, 22, and 23 corresponding to the intake openings 18, 19, and 20, respectively, but being offset laterally outwardly; i. e. in the direction of feed of the corresponding auger flights. The outlet openings 21 are diagonal for the reason that better discharge of fertilizer therethrough by the auger flights is accomplished when the openings are so formed. In other words, fertilizer passing into the auger feed unit 8 through the openings 18, 19, and 20 is fed to, and discharges through, the outlet openings 21, 22, and 23, respectively, in each longitudinal half of said unit.

A short depending outlet spout 24 is in register with each outlet opening, and depends from the under side of the feed tube 14, fertilizer from said spouts either falling onto a broadcast plate (not shown) below the auger feed unit 8, or being coupled to feed tubes, likewise not shown but which are conventional.

Under certain working conditions it is desirable to close one or more of the spouts 24, in which event it is fitted with a bottom cap 25 held in place by a removable cross pin 26. Similarly, it is desirable—under certain working conditions—to close one or more of the intake openings, and in this case the opening is closed by a cap or cover plate 27 which is elongated and substantially semi-circular in cross section. The cap or cover plate 27 is placed on the upper half of the feed tube 14 in overlying relation to the selected one of the intake openings. One of these caps is shown in place over the intake opening 20 at the left-hand end of the auger unit 8. See Fig. 2.

The rotary agitator unit 11 includes, with the shaft 12, a plurality of radial, circumferentially spaced, agitator pins 28, which pins correspond to, and are vertically alined with, the intake openings 18, 19, and 20 of each longitudinal half of the feed tube 14.

Adjacent the ends of the shaft 12, and at points intermediate the radial agitator pins 28, said shaft is fitted with segmental, helical, agitator and feeder blades 29, the endmost blades feeding inwardly from opposite ends of the hopper, while the remaining blades, which are double, feed both right and left therefrom, as indicated by the arrows.

In operation of the fertilizer distributor, the rotary agitator unit 11, including the agitator and feeder blades 29, works effectively to maintain the fertilizer in the hopper under constant agitation directly above the auger feed unit 8. At the same time, the blades 29 feed the fertilizer lengthwise of the shaft 12 in the direction of corresponding ones of the intake openings 18, 19, or 20.

Directly above said intake openings the fertilizer is subjected to further agitation by the radial pins 28; the blades 29 and the pins 28 working effectively to break up lumpy fertilizer and to assure its delivery to the corresponding intake openings 18, 19, and 20.

From said intake openings, the fertilizer is fed, by the auger flights 16 or 17, to the diagonal outlet openings 21, 22, or 23, whence the fertilizer discharges through the outlet spouts 24.

Between the laterally outermost outlet 24 and the adjacent end of the hopper 1, there are safety openings 30 in the bottom of the feed tube 14; the purpose of these safety openings being to prevent any detrimental build-up of fertilizer in opposite ends of said tube under the influence of the auger flights, which build-up might otherwise occur if the adjacent spouts 24, or the hoses connected thereto, should plug.

To broadcast fertilizer delivering from the spout 24, such fertilizer either falls on a deflector pan, as previously stated, or delivers to hoses (not shown) connected to the spouts 24, but which hoses deliver freely toward the ground. For side-dressing along crop rows, or for drilling fertilizer into the ground, hoses are connected to certain of the spouts 24, while feeding from others of such spouts is stopped.

The delivery of fertilizer from any outlet spout 24 may be stopped by application of a bottom cap 25, or the corresponding intake opening (18, 19, or 20) may be closed by one of the caps 27.

With the described fertilizer distributor, including especially the auger feed unit 8 and the rotary agitator unit 11, fertilizer can be distributed from the hopper 1 in a closely regulated or metered quantity and at such points as conditions may require.

The fertilizer distributor thus provides an effective mechanism for the control or regulated distribution of fertilizer for broadcasting, side dressing, or drilling. The volume of feed is, of course, regulated by the speed of the auger feed unit 8, which speed—by reason of the ground drive—will result in the distribution of the same amount of fertilizer per acre regardless of the speed of the supporting implement.

In Fig. 5 there is illustrated a modification of the auger feed unit, which feed unit is here indicated generally at 31. For certain types of uses, it is desired that the outlet spouts 32 be closely adjacent each other in pairs, as shown, and in this connection the corresponding diagonal outlet openings 33 in the feed tube 34 are likewise adjacent each other, but opposed.

The numeral 35 indicates the intake openings staggered lengthwise relative to the corresponding pairs of outlet openings 33; the shaft 36 of the auger feed unit 31 having opposed flights 37, between adjacent intake openings 35, feeding toward each other and discharging through the corresponding ones of the adjacent pair of outlet openings 33.

This modification of the invention functions in the same manner as the embodiment of Figs. 1–4, except that here the outlet tubes 32 are paired in closely adjacent relation.

While primarily for fertilizer distribution, the invention may also be used with seed to feed the same to drills.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a material distributor having a hopper, and a longitudinal auger feed unit in the bottom of the hopper; said auger feed unit comprising a feed tube, there being spaced intake openings in the top of the tube and spaced outlet openings in the bottom of the tube, corresponding intake and outlet openings being staggered relative to each other, and an auger conveyor in the tube having flights arranged to feed material between said corresponding openings; the tube extending to the ends of the hopper, there being endmost outlet openings in the tube adjacent but short of corresponding ends of said hopper, the related flights of the auger conveyor feeding toward said endmost outlet openings from laterally and inwardly thereof, and said tube having safety openings in the bottom thereof between said endmost outlet openings and said corresponding ends of the hopper.

2. In a material distributor having a hopper, and a longitudinal auger feed unit in the bottom of the hopper; said auger feed unit comprising a feed tube, there being spaced intake openings in the top of the tube and spaced outlet openings in the bottom of the tube, corresponding intake and outlet openings being staggered relative to each other, an auger conveyor in the tube having flights arranged to advance and feed material between said corresponding openings, the intake openings extending transversely in the top of the feed tube, and means to close said intake openings separately and selectively, the closure means for each intake opening comprising a removable cap of arcuate cross section fitting the tube.

BERNELL E. PIERCE.

References Cited in the file of this patent

UNITED STATES PATENTS

| Number | Name | Date |
|---|---|---|
| Re. 3,278 | Stevens et al. | Jan. 26, 1869 |
| Re. 4,499 | Wight | Aug. 1, 1871 |
| 283,135 | Minchener | Aug. 14, 1883 |
| 558,715 | Bradley | Apr. 21, 1896 |
| 1,258,515 | Willis | Mar. 5, 1918 |
| 1,829,627 | Bamford et al. | Oct. 27, 1931 |
| 1,947,379 | Cargill | Feb. 13, 1934 |
| 2,180,253 | Moore | Nov. 14, 1939 |
| 2,258,519 | Schumacher | Oct. 7, 1941 |
| 2,511,514 | Rosselot | June 13, 1950 |
| 2,522,693 | Stiteler | Sept. 19, 1950 |
| 2,538,886 | Skibbe et al. | Jan. 23, 1951 |
| 2,543,288 | Hoffstetter | Feb. 27, 1951 |
| 2,594,687 | Scott | Apr. 29, 1952 |

FOREIGN PATENTS

| Number | Country | Date |
|---|---|---|
| 107,569 | Australia | May 18, 1937 |